US012652185B2

(12) United States Patent
Reszka et al.

(10) Patent No.: US 12,652,185 B2
(45) Date of Patent: Jun. 9, 2026

(54) CHARACTERISTIC-BASED VIDEO CONFERENCE ADJUSTMENTS

(71) Applicant: Cisco Technology, Inc., San Jose, CA (US)

(72) Inventors: Konrad Lukasz Reszka, Chapel Hill, NC (US); Kevin Craig Redmon, Apex, NC (US); Bradford Michael Ingersoll, Haw River, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/087,923

(22) Filed: Dec. 23, 2022

(65) Prior Publication Data

US 2024/0214232 A1    Jun. 27, 2024

(51) Int. Cl.
*H04L 12/18* (2006.01)
*G06F 3/16* (2006.01)
*G06V 40/16* (2022.01)

(52) U.S. Cl.
CPC .......... *H04L 12/1822* (2013.01); *G06F 3/165* (2013.01); *G06V 40/172* (2022.01); *G06V 40/178* (2022.01)

(58) Field of Classification Search
CPC .............. H04L 12/1822; G06V 40/172; G06V 40/178; G06F 3/165
USPC ........................................................ 709/204
See application file for complete search history.

(56) References Cited

U.S. PATENT DOCUMENTS

| | | | |
|---|---|---|---|
| 8,209,635 B2 | 6/2012 | Ola | |
| 9,690,334 B2 | 6/2017 | Myers et al. | |
| 10,019,055 B2 | 7/2018 | Miller | |
| 11,099,637 B2 | 8/2021 | Schwesinger et al. | |
| 11,621,979 B1 * | 4/2023 | Slotznick .............. | H04L 65/403 348/14.07 |
| 11,677,575 B1 * | 6/2023 | Libin .................. | H04L 12/1822 709/204 |
| 11,776,197 B2 * | 10/2023 | Liu .......................... | G06T 15/04 345/582 |

(Continued)

FOREIGN PATENT DOCUMENTS

| | | | | |
|---|---|---|---|---|
| CN | 113552996 B | 3/2022 | | |
| CN | 117011327 A | * 11/2023 | ............... | G06T 7/20 |
| WO | WO-2020190001 A1 | * 9/2020 | ............. | G06F 3/167 |

OTHER PUBLICATIONS

Schwartze, et al., "Behavior-Sensitive User Interfaces for Smart Environments", V.G. Duffy (Ed.): Digital Human Modeling, HCII 2009, LNCS 5620, pp. 305-314, 2009, Springer-Verlag Berlin Heidelberg.

*Primary Examiner* — Lan Dai T Truong
(74) *Attorney, Agent, or Firm* — Lee & Hayes, P.C.

(57) ABSTRACT

According to one or more embodiments of the disclosure, a device may detect, from video data captured by one or more cameras, a plurality of participants in a video conference. The device may determine one or more physical characteristics of the plurality of participants. The device may identify one or more target participants from among the plurality of participants based on their one or more physical characteristics. The device may make an adjustment as to how the video conference is presented to the plurality of participants based on those one or more physical characteristics of the one or more target participants.

20 Claims, 11 Drawing Sheets

(56) References Cited

U.S. PATENT DOCUMENTS

| | | | |
|---|---|---|---|
| 2015/0201162 A1* | 7/2015 | Griffin | H04N 7/15 |
| | | | 348/14.07 |
| 2019/0377408 A1 | 12/2019 | Schwesinger et al. | |
| 2022/0132248 A1* | 4/2022 | Basavarajappa | H04S 7/303 |
| 2022/0367043 A1* | 11/2022 | Kayser | G16H 40/63 |
| 2022/0374136 A1* | 11/2022 | Chang | G06F 3/04845 |
| 2022/0394413 A1* | 12/2022 | Seipp | H04N 7/15 |
| 2023/0073828 A1* | 3/2023 | Vendrow | H04L 65/403 |
| 2023/0081717 A1* | 3/2023 | Hoang | H04N 7/15 |
| | | | 348/14.08 |
| 2023/0164296 A1* | 5/2023 | Chang | G06F 3/0485 |
| | | | 348/14.09 |
| 2023/0353678 A1* | 11/2023 | Jia | H04M 3/568 |
| 2024/0185449 A1* | 6/2024 | Bhatt | G06T 7/50 |

* cited by examiner

500

500

500

600

605

START

610

DETECT A PLURALITY OF PARTICIPANTS
IN A VIDEO CONFERENCE

615

DETERMINE PHYSICAL CHARACTERISTICS
OF THE PLURALITY OF PARTICIPANTS

620

IDENTIFY ONE OR MORE TARGET PARTICIPANTS
BASED ON THEIR PHYSICAL CHARACTERISTICS

625

MAKE AN ADJUSTMENT BASED ON
THOSE PHYSICAL CHARACTERISTICS

630

END

CHARACTERISTIC-BASED VIDEO CONFERENCE ADJUSTMENTS

TECHNICAL FIELD

The present disclosure relates generally to characteristic-based video conference adjustments.

BACKGROUND

Widespread adoption and use of video conferencing has reshaped work and the modern workplace. For instance, it is now common for enterprises to have a geographically dispersed (e.g., dispersed locally, nationally, internationally, etc.) collaborative workforce. This workforce may collaborate with each other from their geographically dispersed campuses using video conferencing technology.

Video conferencing allows geographically dispersed groups of people to virtually engage in live meetings without needing to be in the same physical location. Instead, participants can virtually attend the meeting online from any capable device. Today's video conferencing applications allow participants to see each other and/or see any materials being presented in substantially real-time, much like an in-person meeting.

Since a participant interacts with other participants and materials through the video conferencing equipment (e.g., display, speaker, microphone, etc.), the configuration of the equipment is important. Developers of video conferencing applications take great pains to design what that they feel are optimal user configurations for conducting video conferences. However, these configurations are based on assumptions that don't necessarily hold across all video conferences. For instance, the configurations are based on an assumption that the distance between a participant and the video conferencing equipment is static throughout the video conference. As a result, participants are either forced to remain stationary throughout the video conference or to deal with suboptimal performance of the video conferencing equipment, thereby adversely impacting customer satisfaction and adoption.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
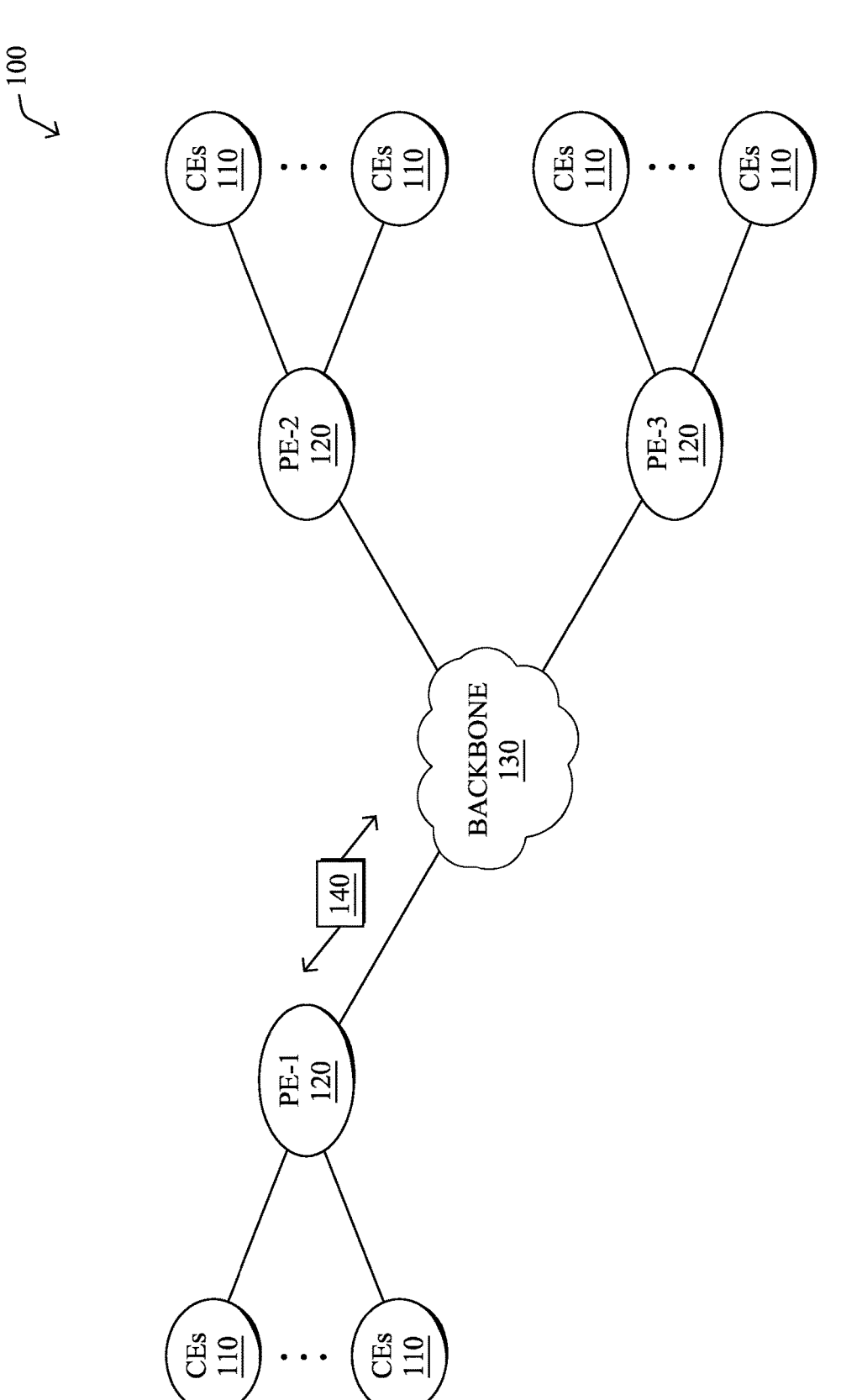
FIGS. 1A-1B illustrate an example communication network.

According to one or more embodiments of the disclosure a device may detect, from video data captured by one or more cameras, a plurality of participants in a video conference. The device may determine one or more physical characteristics of the plurality of participants. The device may identify one or more target participants from among the plurality of participants based on their one or more physical characteristics. The device may make an adjustment as to how the video conference is presented to the plurality of participants based on those one or more physical characteristics of the one or more target participants.

DESCRIPTION

A computer network is a geographically distributed collection of nodes interconnected by communication links and segments for transporting data between end nodes, such as personal computers and workstations, or other devices, such as sensors, etc. Many types of networks are available. For instance, networks may include a virtual private network (VPN), a cellular network, and/or mobile endpoints. Additionally, networks may include local area networks (LANs), wide area networks (WANs), etc. LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
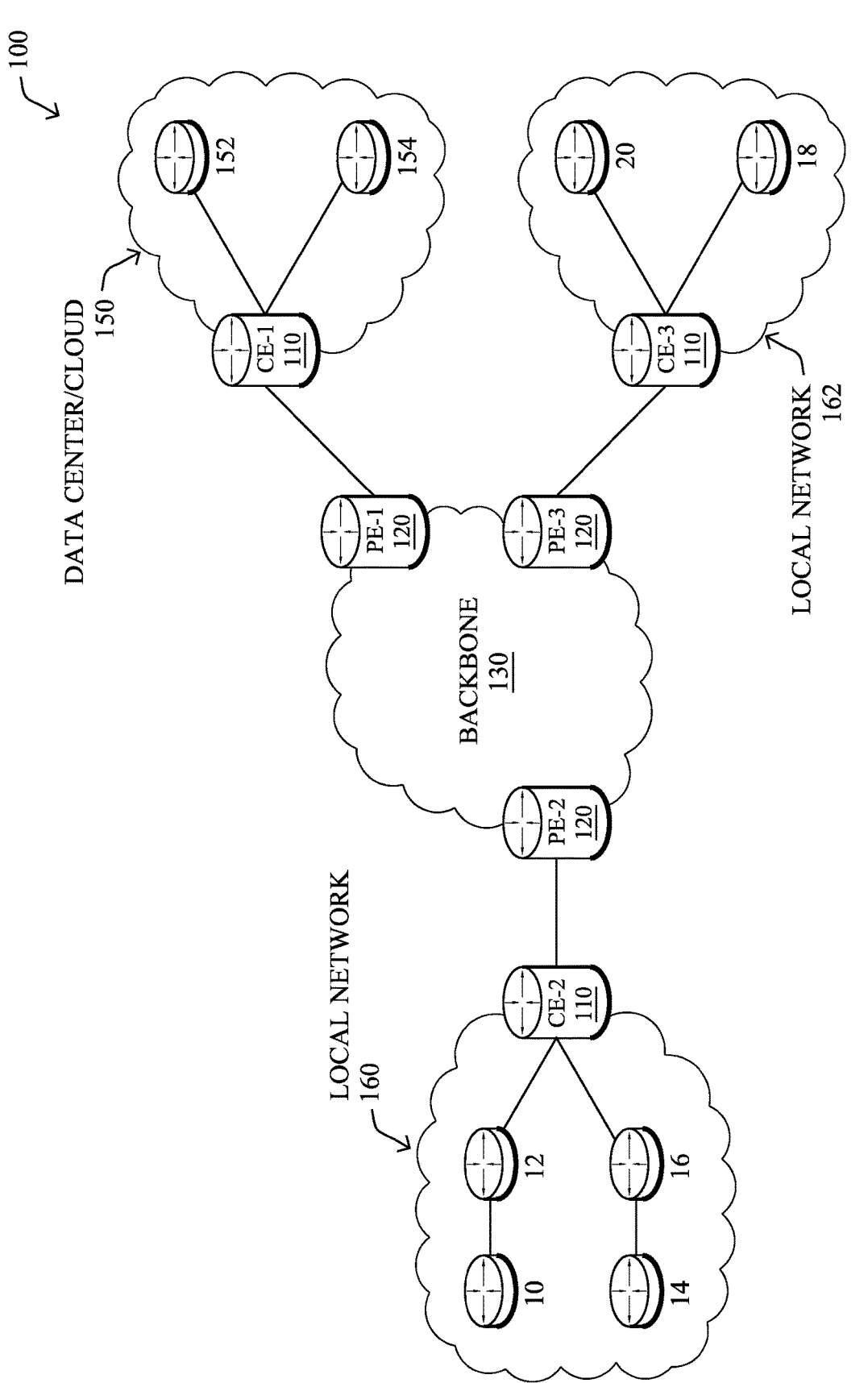

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
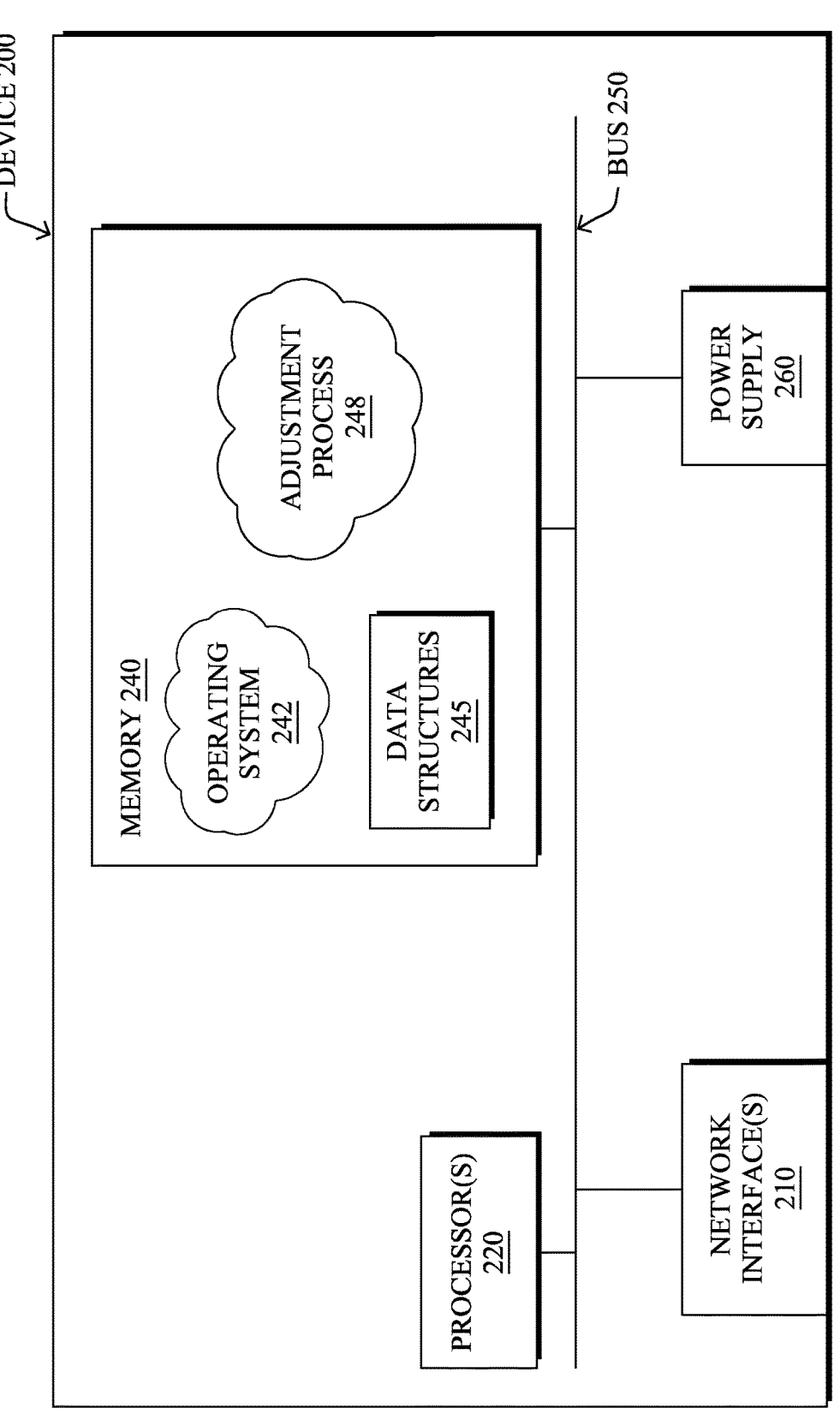
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise adjustment process 248, as described herein, any of which may alternatively be located within individual network interfaces.

As noted above, currently available video conferencing applications restrict the movement of participants with respect to video conferencing equipment and fail to adapt their video conferencing experience to physical characteristics of the participants. These applications are not equipped to automatically adapt the performance of the video conferencing equipment to the physical characteristics of a participant.

For instance, when a participant gets up and moves around a room during a video conference, the user interface on the display for the video conference doesn't adapt to the move, the volume of a speaker for the video conference doesn't adapt to the move, the audio gain applied to a microphone for the video conference doesn't adapt to the move, etc. Therefore, a participant who, for example, traveled from the front of a conference room within two feet of the video conferencing equipment to the back of the conference room ten feet from the video conferencing equipment may no longer be able to clearly read video conferencing content on the display, clearly hear video conferencing content from the speaker, nor be clearly heard over a conferencing microphone while speaking at the same volume.

Likewise, if a participant has any sort of impairment, these applications are not able to recognize or adapt to it. Therefore, a vision-impaired person may not be able to clearly read video conferencing content on the display, a hearing-impaired person may not be able to clearly hear video conferencing content from the speaker, and a speaking-impaired person may not be able to be clearly heard over the microphone.

Identifying and/or adapting to these physical characteristics is not a straight-forward undertaking. For example, attempts to identify and adapt to physical characteristics may be frustrated by the fact that there are multiple participants engaged in a same video conference within the same physical space.

As previously mentioned, some video conferences involve groups of participants engaging in a video conference from a common physical space such as a conference room. In such instances, multiple participants with multiple physical characteristics may be interfacing with the same video conferencing equipment. As a result, it may not be immediately clear to which of the participants the video conference should be adapted without further investigation or identification of the participants.

Characteristic-Based Video Conference Adjustments

The techniques herein introduce mechanisms to automatically adjust the configuration of video conferencing equipment based on physical characteristics of a target participant. Various mechanisms are described for automatically identifying those physical characteristics of a target participant. In addition, various adjustments to the configuration of video conferencing equipment that can be made based on those physical characteristics are described.

Illustratively, the techniques described herein may be performed by hardware, software, and/or firmware, such as in accordance with adjustment process 248, which may include computer executable instructions executed by the processor 220 (or independent processor of interfaces 210) to perform functions relating to the techniques described herein.

Specifically, according to various embodiments, a device may detect, from video data captured by one or more cameras, a plurality of participants in a video conference. The device may determine one or more physical characteristics of the plurality of participants. The device may identify one or more target participants from among the plurality of participants based on their one or more physical characteristics. The device may make an adjustment as to how the video conference is presented to the plurality of participants based on those one or more physical characteristics of the one or more target participants.

Figure 3:
FIG. 3 illustrates an example architecture for characteristic-based video conference adjustments.
Figure 3:
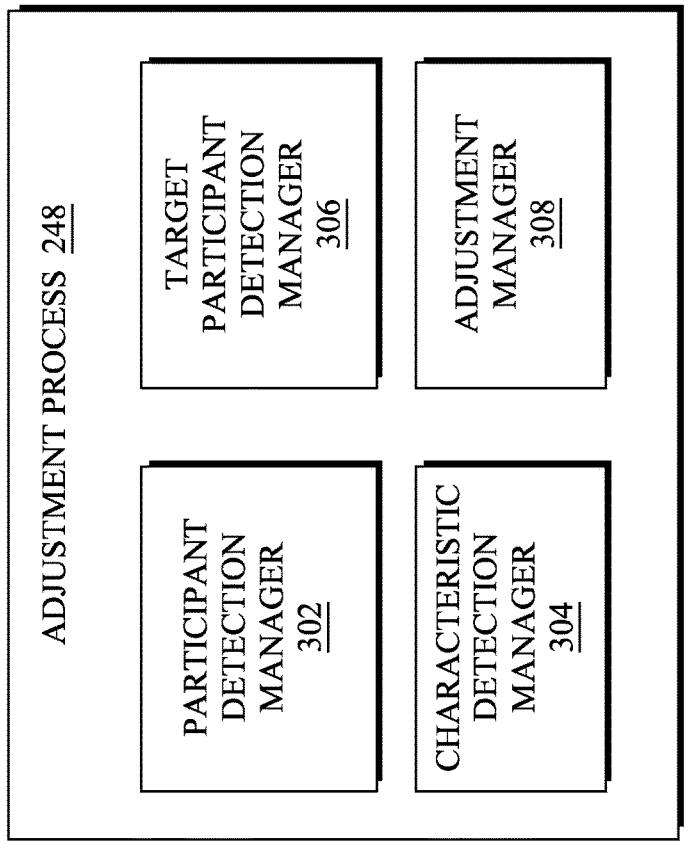

Operationally, FIG. 3 illustrates an example of an architecture 300 for characteristic-based video conference adjustments according to various embodiments. At the core of the architecture is adjustment process 248, which may be executed by a device that provides a video conferencing service in a network, or another device in communication therewith. In general, the adjustment process 248 may be executed to configure a video conferencing experience and/or video conferencing equipment during a video conferencing session and, therefore, may be executed on any device associated with the delivery of the video conferencing session.

As shown, adjustment process 248 may include a participant detection manager 302, a characteristic detection manager 304, target participant detection manager 306, and/or an adjustment manager 308. As would be appreciated, the functionalities of these components may be combined or omitted, as desired. In addition, these components may be implemented on a singular device or in a distributed manner, in which case the combination of executing device can be viewed as their own singular device for purposes of executing adjustment process 248.

During execution, participant detection manager 302 may detect participants of a video conference during the video conference session. Participant detection manager 302 may use any number of detection techniques (e.g., light-based, acoustic, pressure, radar, video image processing, signal tracking, self-identification, facial recognition/identification/detection, etc.) to detect the presence of participants of a video conference in a conferencing space (e.g., conference room, office, room, etc.).

The participant detection manager 302 may detect the presence of participants of a video conference using data and/or measurements from any number of devices capable of providing inputs for occupancy sensing. For instance, participant detection manager 302 may use video data captured by one or more cameras to detect the presence of participants of a video conference. In some examples, the one or more cameras may be the same cameras used to capture the images presented during the video conference. In various embodiments, the participant detection manager 302 may process images from video conferencing cameras by applying facial recognition techniques to the images. Portions of the images recognized as faces by these techniques may be identified by bounding boxes or other means of defining dimensions or coordinates of a face within the image.

As previously mentioned, participant detection manager 302 may detect a plurality of participants of a video conference. This plurality of participants may be participants of the video conference that are co-located in the same conferencing space and/or that are accessing the same video conferencing equipment (e.g., viewing the same display, listening to the same speaker, detected on the same microphone, etc.). That is, participant detection manager 302 may detect multiple participants within detection range of video conferencing equipment.

During execution, participant characteristic manager 304 may determine one or more physical characteristic of the participants identified by participant detection manager 302. Physical characteristics of a participant may include one or more of a plurality of characteristics attributable to a participant. These physical characteristics may be determined use any number of detection techniques or sensors (e.g., light-based, acoustic, pressure, radar, video image processing, signal tracking, self-identification, facial recognition/identification, etc.) to recognize physical characteristics of individual participants of a video conference.

Participant characteristic manager 304 may determine the one or more physical characteristics dynamically, periodically, continuously, etc. Participant characteristic manager 304 may determine the physical characteristics in substantially real-time during the video conference. In this manner, participant characteristic manager 304 may track physical characteristics of participants and/or any change in their physical characteristics throughout a video conferencing session.

For instance, a physical characteristic may include a location or position of a participant. This may include the location or the position of the participant within a room where the video conference is attended. The location or position of the participant may be the location or the position of the participant relative to other participants, relative to video conferencing equipment, relative to another device, etc.

In the same vein, the physical characteristic may include the distance between the participant and another participant, video conferencing equipment, and/or a distance measuring reference point or device. For instance, the physical characteristic of a participant may include the distance between that participant and a presentation interface (e.g., a user interface, a display, a speaker, a microphone, etc.) that communicates data for the video conference from/to a plurality of participants.

As previously mentioned, a physical characteristic of a participant may be determined utilizing any number of detection techniques or sensors adaptable to recognize physical characteristics of video conference participants. An example of one such detection technique as it relates to the aforementioned distance measurements is facial detection-based distance measurements and/or estimations. In such examples, participant characteristic manager 304 may cause images of participants captured from video cameras within the environment where the video conference is being attended to be processed by facial detection analysis to find faces within the images. The facial detection analysis may establish a bounding box or other image coordinate or dimension identification mechanism around each participant's face within the images.

A bounding box or other image coordinate or dimension identification mechanism bounding a participant's face may be associated with and/or have dimensions. For example, the bounding box or other image coordinate identification mechanism bounding a participant's face may have a width or other dimension which may be definable in pixels or some other unit of measure. In various embodiments, the width of a facial bounding box bounding a participant's face may be a physical characteristic of that participant. Since, as described in greater detail below, bounding box dimensions may have a definable relationship to a distance between the participant and video conferencing equipment, the bounding box may be a proxy for that distance measurement. For example, the smaller the width of the bounding box the further the participant is from the video conferencing equipment and the larger the width of the bounding box the closer the participant is to the video conferencing equipment and the larger the width of the bounding box For example, participant characteristic manager 304 may calculate or estimate the distance between the participant and video conferencing equipment based on the width of the bounding box or other image coordinate identification mechanism bounding a participant's face. For instance, in some examples, an established correlation between width of the bounding box bounding a participant's face and a distance that the participant is located from a camera capturing the images of the face may be used to calculate a distance between that participant and a display for the video conference session when the display and the camera are co-located and/or equidistant from the participant (although this arrangement is not a requirement for this functionality). For example, participant characteristic manager 304 may develop and/or reference a correlation between the width of the bounding box bounding a participant's face and a distance separating the participant from the camera or other video conferencing equipment in order to calculate or estimate the distance physical characteristic of the participant.

Additionally, and/or alternatively, other types of distance measurement techniques may be employed to determine the distance between the participant and video conferencing equipment. For example, data from proximity or ranging sensors such as time-of-flight, radar, LIDAR, etc. based sensors may be utilized by participant characteristic manager 304 to calculate the distance between the participant and video conferencing equipment.

Likewise, radio signal-based distance measurement techniques may be utilized by participant characteristic manager 304. For instance, participant characteristic manager 304 may use triangulation, time-of-flight, short-range communication protocol, proximity-based communication protocol, etc. based techniques that perform proximity or ranging based on a signal from a participant's device or other devices located in the room where the video conference is attended.

Furthermore, acoustic-based distance measurement techniques may be utilized by participant characteristic manager 304. For instance, participant characteristic manager 304 may use sonar, microphone noise detection level, etc. based techniques that perform proximity or ranging in the room where the video conference is attended. In an example, a participant's relative distance from the video conferencing equipment may be based on the sound levels picked up by a microphone used in the video conferencing session while the participant is speaking. For instance, when a sound level is higher it may be interpreted as the participant being closer and when the sound level is lower it may be interpreted as the participant being further away. Directional microphones and/or other noise segmenting technologies may be utilized to differentiate audio from a particular participant as opposed to other participants or sound sources.

Again, participant characteristic manager 304 may dynamically track the distance measurements of the participant. Therefore, the participant characteristic manager 304 may recognize and/or react to, as described in greater detail below, changes in the physical characteristics of a participant. For instance, when the distance of the participants from the video conferencing equipment changes, participant characteristic manager 304 may recognize and react to that change in substantially real-time during a video conferencing session. As a participant moves around a room during a video conference, their distance measurements and/or bounding box sizes will fluctuate.

A physical characteristic may also include an identity of the participant. The identity of the participant may include the name or other user profile information of the participant. The identity may include the identity of the participant relative to and/or in the context of the video conference (e.g., scheduler, video conferencing equipment owner, observer, speaker, presenter, host, etc.). The identity may include the identity of the participant relative to and/or in the context of an enterprise (e.g., team leader, team member, executive, engineer, manager, etc.) involved in the video conference.

Participant characteristic manager 304 may determine the identity of a participant using login identifiers, facial recognition, biometric recognition, voice recognition, seating position recognition, associated device recognition, self-identification, etc. In some instances, a determination of a participant's identity may occur only once (e.g., upon launching the video conference session), such as with respect to the name of the participant or their role in scheduling or hosting the video conference.

In other instance, a determination of a participant's identity may occur and/or be rechecked frequently. For instance, the person speaking during a collaborative video conference may change from moment to moment. As such, a person initially identified as the speaker may not be the speaker moments later. Likewise, the identity of the participant as a speaker or an observer may change as well. Therefore, participant characteristic manager 304 may determine some forms of identity more frequently and/or continuously and not others. In this manner, participant characteristic manager 304 may continually adjust the identity assigned to participants to accurately reflect their current role in the video conferencing session.

In addition, a physical characteristic may include an attribute such as an age of a participant. In some instances, an age of a participant may be indicative of a participant's ability to move, see, hear, project their voice, etc. Similarly, a physical characteristic may include another ability indicator (e.g., uses a cane, uses a wheelchair, wears eyeglasses, uses a voice assist device, uses a hearing aid, has an assigned disability status, is squinting at video conference display, is cupping and or turning ear in direction of speaker when audio is played, etc.). Moreover, a physical characteristic may include a characteristic such as a mental ailment and/or characteristic (e.g., autism spectrum disorder, seizures due to lighting changes, auditory sensitivities, etc.).

During execution, target participant detection manager 306 may identify one or more target participants of a video conference session. The target participant detection manager 306 may identify the one or more target participants from among the plurality of participants in the same physical conferencing space and/or participating in the same video conference as the target participants.

In some instances, people that are in the same room as the target participants may not necessarily be actively participating in the video conference. However, the term participants is intended to include these people as well. For example, the term participants should be understood to include other people in the same physical conferencing space as the target participants and/or detectable by, in view of, and/or exposed to the same video conferencing equipment as the target participants without necessarily engaging in, paying attention to, being an invitee of, etc. the video conference session. As an example, a video conference may include a target participant who is an enterprise employee attending the conference from his home and the non-target participants may include his family members that are in the same room but not necessarily involved in the video conference.

The one or more target participants may be the particular participants to which the video conference experience and/or equipment should be adapted, as described in greater detail below. For instance, a target participant may be a participant who has priority over the others when considering what adjustments to apply to the delivery of the video conference. The target participant may be the most important or critical person or group of people to the video conference session for a given moment of the session. For instance, the target participant may be the person playing the most active role and/or engaging most prominently in the video conferencing session. In addition, the target participant may be the person to whom the video session is targeted (e.g., a customer target of a sales presentation, etc.), a person hosting the session, a person with highest relative rank within a team or enterprise, an active presenter, an active speaker, etc.

Target participant detection manager 306 may identify the one or more target participants from among the plurality of participants based on their one or more physical characteristics. For example, target participant detection manager 306 may utilize the identity of each of the plurality of participants to identify which of them is a target participant. For instance, the identity of each participant within the context of the video conference (e.g., scheduler, video conferencing equipment owner, observer, speaker, presenter, host, etc.) or within the context of an enterprise (e.g., team leader, team member, executive, engineer, manager, etc.) may be utilized by target participant detection manager 306 to identify the target participants. In various embodiments, the target participant detection manager 306 may identify the target participant as the presenter or speaker based on their assigned role and/or based on whether they are actively speaking as determined by audio, video, microphone-based, etc. analysis.

While in some examples the target participant and/or their identity may remain fixed throughout a video conference session, in other examples the target participant and/or their identity may change throughout the course of a video conference session. Therefore, the target participant detection manager 306 may dynamically identity and/or switch between target participants.

For example, whichever participant is actively speaking in the physical conferencing space may be the target participant. In such examples, target participant detection manager 306 may continuously monitor which participant is speaking during the session and identify that participant as the target participant until another participant in the same physical conferencing space is detected as speaking for over a threshold amount of time. At that point, target participant detection manager 306 may identify the new speaker as the new target participant and/or re-identify the former speaker as an observer and/or as a non-target participant.

During execution, adjustment manager 308 may determine an adjustment to be made to the video conference. The adjustment may be an adjustment as to how the video conference is delivered. For instance, the adjustment may be an adjustment to how the video conference is presented to the plurality of participants. This may include adjustments to electronic displays, speakers, microphones, lighting, user interfaces, etc.

Adjustment manager 308 may determine the adjustment based on the one or more physical characteristics of the one or more target participants. For example, adjustment manager 308 may determine an adjustment to be applied based on the distance of the one or more target participants from video conferencing equipment and/or the bounding box dimension proxy representation of the same.

In instances where the one or more target participants is a single participant, then that single participant's distance from the video conferencing equipment and/or the bounding box dimension proxy representation of the same may be used to determine the adjustment. In instances where the one or more target participants number more than a single participant, then an average and/or a weighted average (e.g., weighted by a priority of each participant further based on the one or more physical characteristics of each of the participants) of the distances of the one or more target participants and/or the bounding box dimension proxy representation of the same may be used to identify the adjustment to be applied. In some examples where the one or more target participants number more than a single participant, then a distance of a closest and/or a furthest away participant from the video conference equipment and/or the bounding box dimension proxy representation of the same may be used to identify the adjustment to be applied.

In various embodiments, adjustment manager 308 may determine the adjustment to be applied by referencing the one or more physical characteristics of the one or more target participants against one or more physical characteristics thresholds. For example, adjustment manager 308 may compare the one or more physical characteristics of the one or more target participants to preconfigured breakpoint conditions that define physical characteristic values that are associated with various adjustments. Whenever a breakpoint condition is met then its corresponding adjustment may be identified and/or applied by adjustment manager 308.

Adjustment manager 308 may also adjust the one or more physical characteristics thresholds or breakpoints. For example, adjustment manager 308 may adjust a breakpoint physical characteristic value associated with an adjustment and/or adjust an adjustment associated with a breakpoint physical characteristic value.

The adjustment may be based on one or more physical characteristics of the one or more target participants. For instance, adjustment manager 308 may adjust the breakpoint physical characteristic value and/or an associated adjustment based on a target participants age or ability indicator. For example, if a target participant has physical characteristics indicative of vision impairment, then adjustments related to greater visibility of the video conference may occur at a closer distance between the participant and the video conference equipment. Likewise, if a target participant has physical characteristics indicative of hearing impairment, then adjustments related to increasing audio levels of the video conference may occur at a closer distance between the participant and the video conference equipment.

Adjustment manager 308 may identify and/or make adjustments that affect how the video conference operates (e.g., how data is collected, how data is presented, how video conference equipment operates, etc.). For example, an adjustment may include an adjustment to how a user interface of the video conference is displayed at a presentation interface, such as an electronic display, that outputs data from the video conference to the plurality of participants. This adjustment may include changing which display of a plurality of available displays to use to present a user interface of the video conference. The adjustment may include reorienting a direction and/or tilt angle of an electronic display that is displaying a user interface of the video conference in order to optimize its orientation to the one or more target participants. The adjustment may include adjusting a setting (e.g., brightness, contrast, resolution, color settings, etc.) of an electronic display that is displaying a user interface of the video conference to optimize its viewability to the one or more target participants.

In addition, the adjustment may include adjusting the user interface of the video conferencing application. For example, the adjustment may include an adjustment to the layout or configuration of the user interface such as by adjusting the type of information, the amount of information, the amount of other presenters, the size of elements, the relative organization of elements, etc. that are caused to be displayed to the plurality of participants.

Expanding on some of these examples, when one or more target participants are relatively close to the display (e.g., two feet or less), then adjustment manager 308 may adjust a user interface of a video conference application to include a more information and/or element dense configuration. In such a configuration, the user interface elements (e.g., a tile containing another participant's video feed, presentation materials, virtual controls, etc.) may be configured to have a first, relatively small, size as presented on the display. Since the target participant is close to the display where the user interface is displayed, they may be better positioned to see the smaller elements. Further, in such a configuration, the user interface may be configured to include more user interface elements (e.g., additional tiles containing additional participants' video feeds, more presentation materials such as related notes and presentation controls, more virtual controls, etc.) presented on the display at the same time. Again, since the target participant is close to the display where the user interface is displayed, they may be better positioned to be able to clearly see each element of a more densely populated display.

Conversely, when the one or more target participants are relatively far from the display (e.g., ten feet or greater) then adjustment manager 308 may adjust a user interface of a video conference application to include a less information and/or element dense configuration. In such a configuration, the user interface elements may be configured to have a second, relatively larger, size as presented on the display. Since the target participant is farther from the display where the user interface is displayed, they may not be able to see sufficient detail of the smaller elements whereas the larger elements may still be discernable. Further, in such a configuration, the user interface may be configured to include fewer user interface elements presented on the display at the same time. Again, since the target participant is farther from the display where the user interface is displayed, they may not be able to clearly see each element of a more densely populated display, whereas a more sparsely populated display may still be discernable.

In some instances, this may mean adjusting the user interface to only display one or more highest priority elements. For instance, if a target participant in the room has been determined as having the physical characteristic of being a presenter, then the adjustment manager 308 may adjust a user interface of a video conference application to include only a large tile featuring the presentation materials being referenced by that target participant when they are far from the display. Conversely, if a target participant in the room has been determined as having the physical characteristic of being an observer, then the adjustment manager 308 may adjust a user interface of a video conference application to include a large tile(s) featuring the video feed of the presenter and/or presentation materials being referenced by the presenter.

It can also be appreciated how these same types of adjustments may be made with respect to physical characteristics such as ability indicators of target participants. For example, adjustment manager 308 may adjust a user interface for a target participant located relatively close to the display with a visual impairment similar to how it adjusts the user interface with respect to non-visually impaired target participants that are relatively far from the display, etc.

In addition, by using a plurality of physical characteristic thresholds corresponding to a plurality of adjustments across a spectrum of adjustment levels, any granularity of adjustment may be achieved with the disclosed techniques. As such, many intermediate physical characteristic thresholds and/or many intermediate adjustments are contemplated for various embodiments.

In further embodiments, the adjustments may include adjustments to the operation and/or sensitivity of a variety of video conferencing equipment. For instance, an adjustment may include an adjustment to a volume or other audio level output at a presentation interface such as a speaker that outputs data for the video conference to the plurality of participants. In some examples, the adjustment may additionally include providing subtitles of other participants' speech. Again, the farther the target participant from the speaker and/or the greater the level of hearing impairment of the target participant, the greater the increase of these levels by the adjustment manager 308, and vice versa.

Additionally, an adjustment to the volume or other audio level output at the presentation interface may be implemented as a mitigating adjustment. For instance, when a participant is detected in the physical environment who is not supposed to be part of the video conferencing session (e.g., a person walking by the target participant when the target participant is attending the video conferencing session in a public setting, etc.), then the volume of the video conferencing session may me reduced and/or muted. The same strategy may be applied to the video portion of the video conferencing session, such as by disabling the video feed. In some instances, this mitigation adjustment may be maintained until the unintended participant leaves the viewable area of a camera and/or is determined to be outside the hearing range of the audio and/or viewing range of the video.

Another adjustment may include an orientation, a zoom setting, a lighting correction, a color correction, etc. adjustment applied to a camera capturing the video for the video conference based on the target participant's distance from the camera. Yet another adjustment may include an adjustment to the audio gain, audio isolation, noise cancellation, directional microphone selection, etc. applied to audio captured for the video conference based on the target participant's distance from the microphone, room noise levels, and/or speaking impairments. In some instance, the adjustment may include an adjustment to the lighting (e.g., increase to improve image capture, decrease to improve display visibility, etc.) in the physical conferencing space based on the target participant's distance from the camera and/or display, appearance, clothing, shadows, etc.

In addition, any adjustment that optimizes the ability of the one or more target participants to engage in the video conference may be associated to a triggering physical characteristic threshold and applied during the video conference. These adjustments may impact and/or even degrade the ability of one or more non-target participants to engage in the video conference in the same physical conferencing space. However, the adjustments are based on the one or more physical characteristic of the one or more target participants and, therefore, the experience of the non-target participants is not the focus or concern of the adjustment manager 308 and/or the adjustment scheme that it implements.

FIGS. 4A-4E illustrate examples of a deployment 400 of an adjustment process (e.g., adjustment process 248) for characteristic-based video conference adjustments according to various embodiments. Deployment 400 includes an image 402 taken of a physical conferencing space where a video conference is being conducted. In some examples, image 402 is a portion of a video feed that is being collected as part of the video conference. Image 402 may be an image collected by a video conferencing camera located in the physical conferencing space where a video conference is being conducted.

Image 402 may be an image of a plurality of participants 404-1 . . . 404-N in the video conference. Image 402 may be processed using facial recognition, identification, detection, etc. techniques in order to identify the location of each of the plurality of participants 404-1 . . . 404-N faces within image 402. In various embodiments, each identified face may be indicated by a respective bounding box 406-1 . . . 406-N.

Each of the bounding boxes 406-1 . . . 406-N may have one or more dimensions. For example, each of the bounding boxes 406-1 . . . 406-N may have a width. A known and/or measured relationship between a width of a bounding box and approximate distance of the subject from one or more pieces of video conferencing equipment may be known. Table 1 illustrates an example relationship between a width of a bounding box and approximate distance of the subject from one or more pieces of video conferencing equipment.

TABLE 1

| FACIAL BOUNDING BOX WIDTH IN PIXELS | APPROXIMATE DISTANCE |
|---|---|
| 300-500 px | 2 ft |
| 170-200 px | 4 ft |
| 120-150 px | 7 ft |
| 100 px | 10 ft |

While the dimensions of the face of each of the plurality of participants 404-1 . . . 404-N may be unique, face size across people is consistent enough that this relationship may be applied to all the plurality of participants 404-1 . . . 404-N. In some instances, however, the width of a bounding box for a particular face may vary based on source camera resolution and/or scaling. As such, widths and/or their corresponding distances may be adjusted on a per-camera basis.

Therefore, a width of each of the bounding boxes 406-1 ... 406-N may be calculated. The calculated width for a bounding box may be used to determine an approximate distance between a corresponding participant and video conferencing equipment such as a camera, a display, speaker, etc.

One or more target participants (e.g., participant 404-1 in FIGS. 4A-4D, participant 404-1 and participant 404-2 in FIG. 4E) may be identified in each image 402. The one or more target participants may be identified based on their one or more physical characteristics.

Once identified, the width of a respective bounding box around the face of each target participant may be used to identify an adjustment as to how the video conference is presented to the plurality of participants 404-1 ... 404-N. In various embodiments, the adjustment may be identified using predefined relationships between a set of physical characteristic breakpoints and corresponding adjustments. Table 2 illustrates example relationships between a set of physical characteristic breakpoint values and their corresponding adjustments.

TABLE 2

| BREAK-POINT | BOUNDING BOX WIDTH | SITUATION | ADJUSTMENT |
|---|---|---|---|
| 1 | ≥300 px | Participant sitting at their desk, near display screen. | Information dense layout, video from all participants as well as the presentation shown (e.g., a 5 × 5 grid of video participants) |
| 2 | >175 px <300 px | Participant at whiteboard behind their desk or in a larger room. | Video from non-critical participants can be hidden, display presentation and a few recent active participants only (e.g., a 3 × 3 grid of video participants) |
| 3 | ≤175 px | Participant at the back of a large room, or in a different room entirely. | Only the most critical information displayed on the interface (e.g., the presentation and/or the active speaker) |

These breakpoints may be modified based on physical characteristics (e.g., age, ability indicator, etc.) of the target participants. Once an adjustment has been identified (e.g., a physical characteristic breakpoint has been met by a physical characteristic measurement of a target participant) the adjustment may be applied.

Figure 4A:
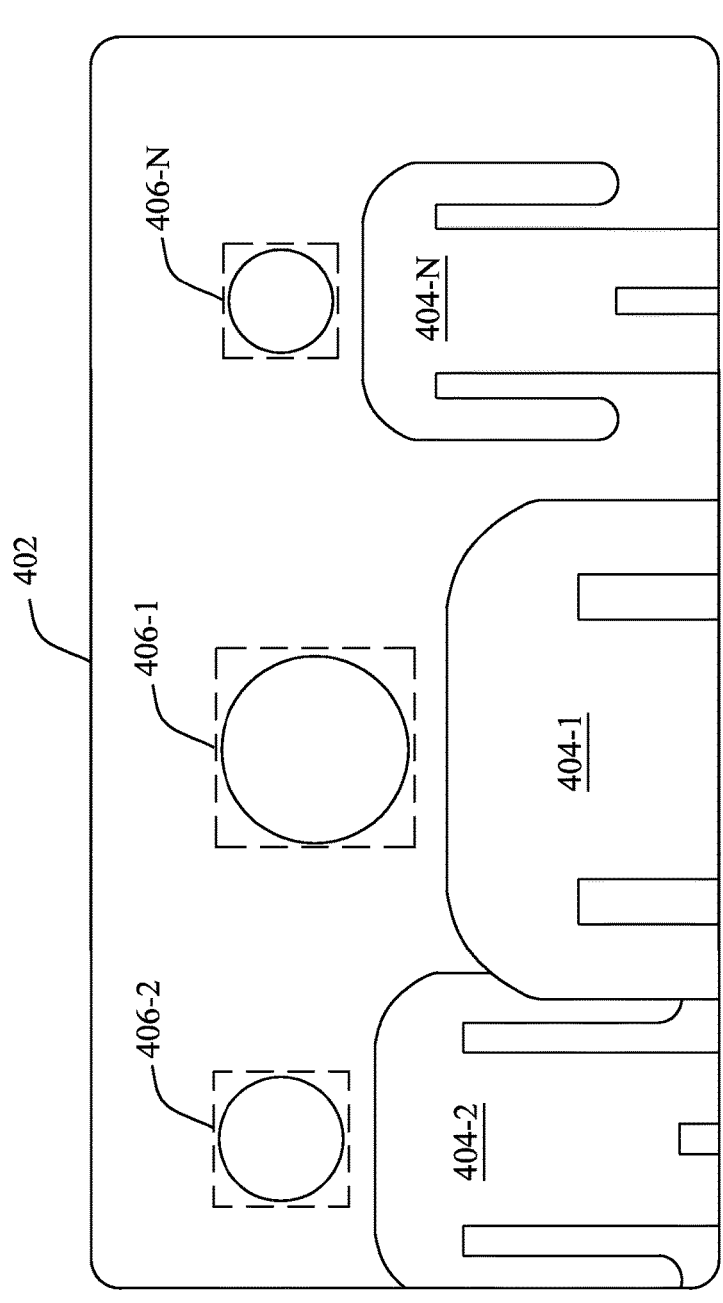
FIGS. 4A-4E illustrate examples of deployments of an adjustment process for characteristic-based video conference adjustments.

For example, in FIG. 4A participant 404-1 may be identified, based on his physical characteristics, to be the target participant. The width of the bounding box 406-1 around the face of participant 404-1 may be determined as four hundred and twenty pixels. As such, the target participant may be determined to be two feet from a camera and/or a display used for the video conference as based on the relationship defined in Table 1. By referencing Table 2, an adjustment corresponding to that width and/or distance may be identified. In this example, the adjustment is to configure the user interface in an information dense layout with video from all participants as well as the presentation shown (e.g., a 5×5 grid of video participants). This adjustment may then be applied.

Figure 4B:
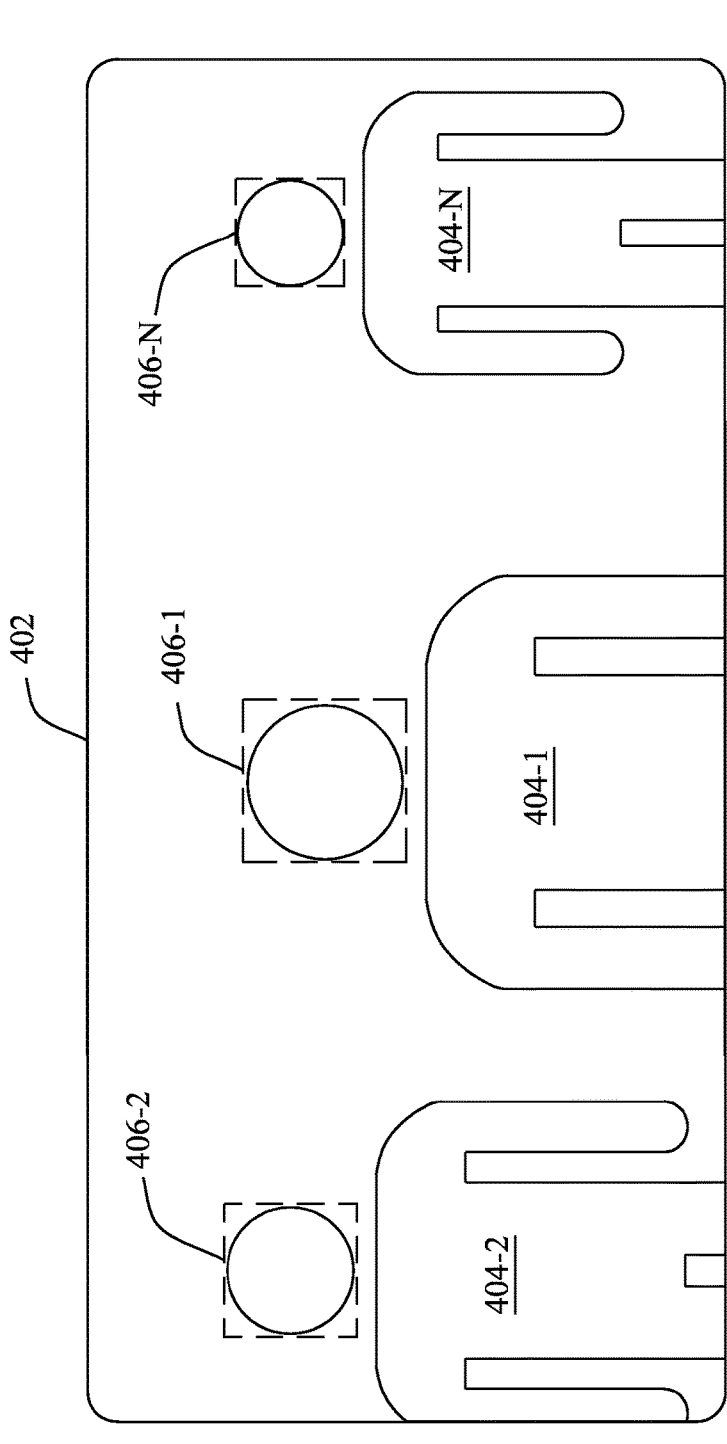

In FIG. 4B, participant 404-1 may be identified, based on his physical characteristics, to be the target participant. The width of the bounding box 406-1 around the face of participant 404-1 may be determined as one hundred ninety pixels. As such, the target participant may be determined to be four feet from a camera and/or a display used for the video conference as based on the relationship defined in Table 1. By referencing Table 2, an adjustment corresponding to that width and/or distance may be identified. In this example, the adjustment is to configure the user interface so that video from non-critical participants is hidden and only the presentation and/or a few recently active participants (e.g., a 3×3 grid of video participants are displayed). This adjustment may then be applied.

Figure 4C:
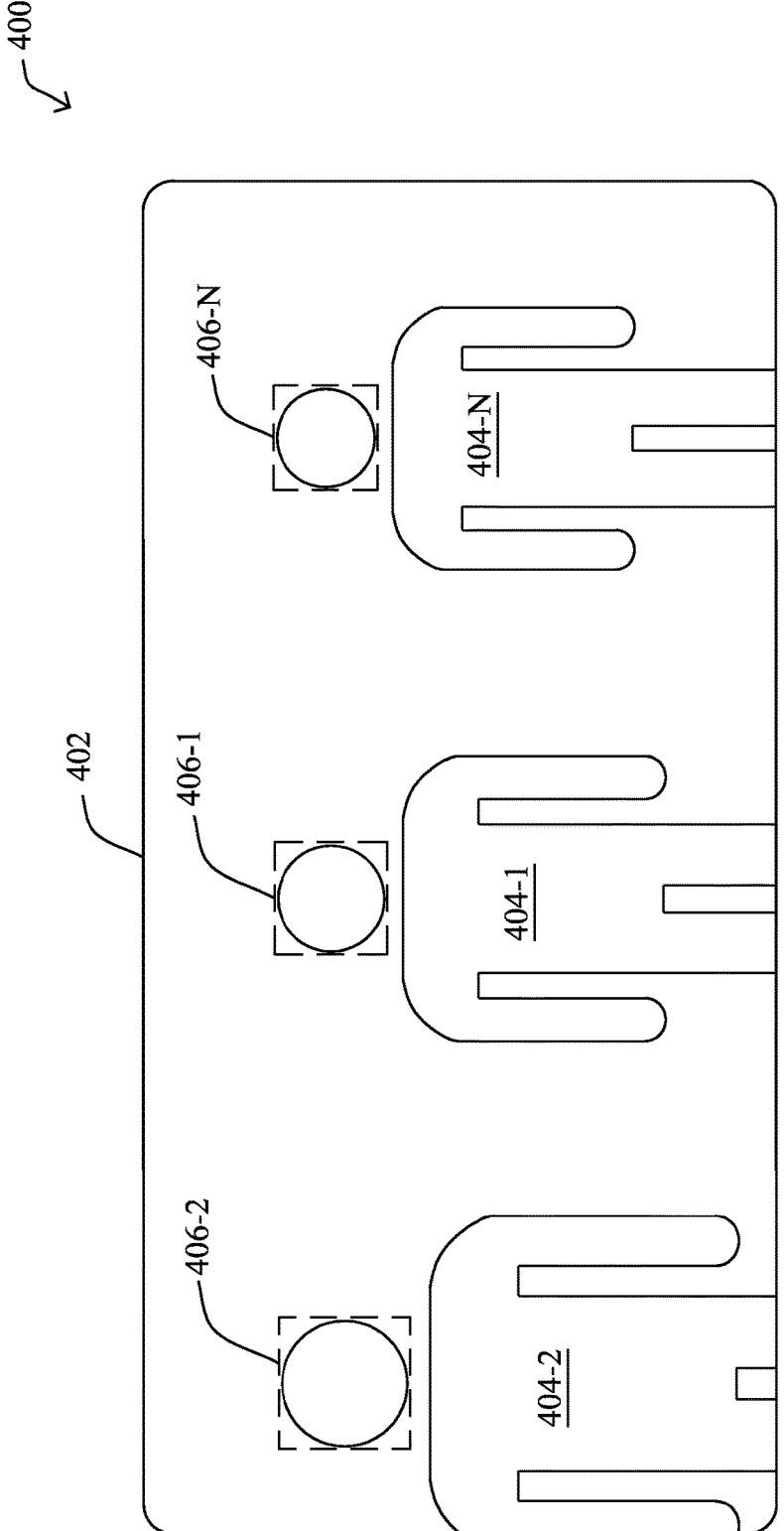

In FIG. 4C, participant 404-1 may be identified, based on his physical characteristics, to be the target participant. The width of the bounding box 406-1 around the face of participant 404-1 may be determined as one hundred twenty-five pixels. As such, the target participant may be determined to be seven feet from a camera and/or a display used for the video conference as based on the relationship defined in Table 1. By referencing Table 2, an adjustment corresponding to that width and/or distance may be identified. In this example, the adjustment is to configure the user interface so that only the most critical information displayed on the interface (e.g., the presentation and/or the active speaker) is displayed. This adjustment may then be applied.

Figure 4D:
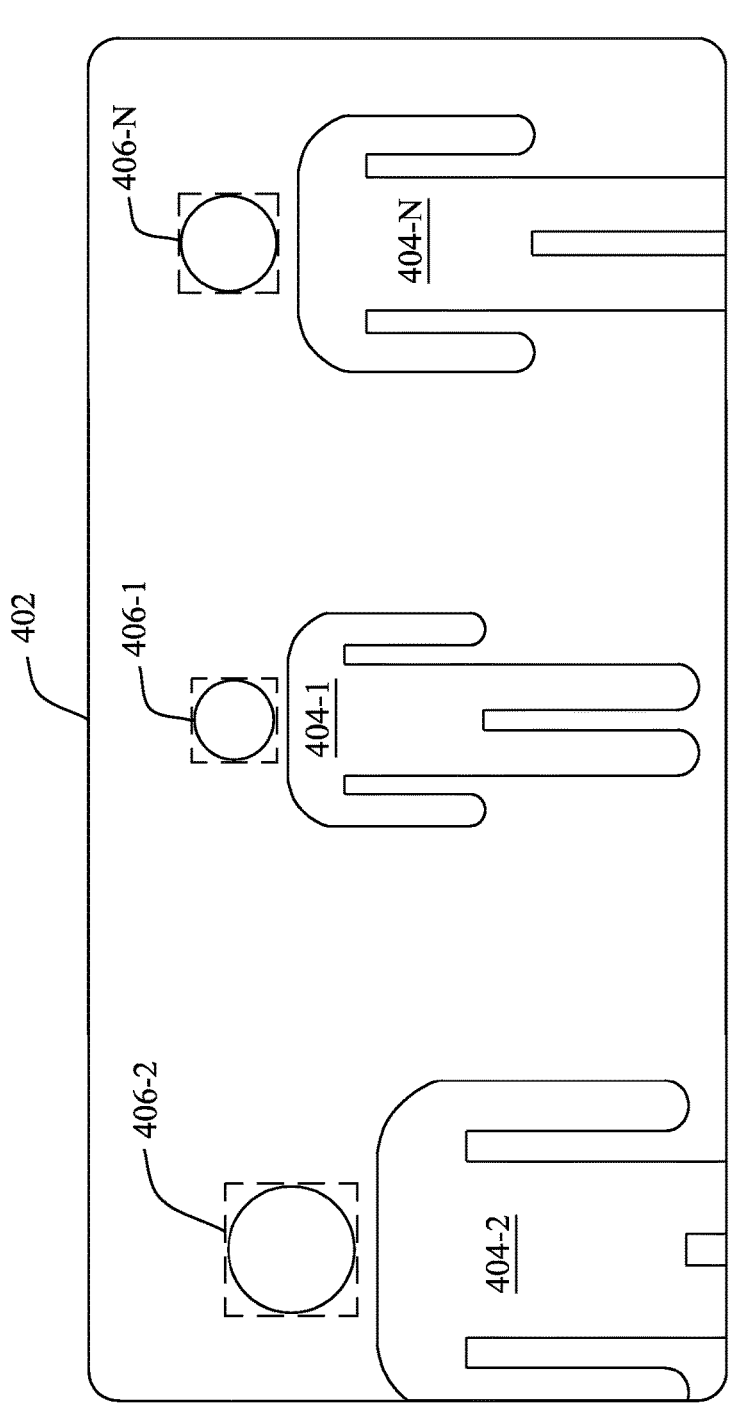

In FIG. 4D, participant 404-1 may be identified, based on his physical characteristics, to be the target participant. The width of the bounding box 406-1 around the face of participant 404-1 may be determined as one hundred pixels. As such, the target participant may be determined to be ten feet from a camera and/or a display used for the video conference as based on the relationship defined in Table 1. By referencing Table 2, an adjustment corresponding to that width and/or distance may be identified. In this instance, the adjustment may be the same adjustment as was applied with respect to FIG. 4C.

Figure 4E:
Figure 4E:
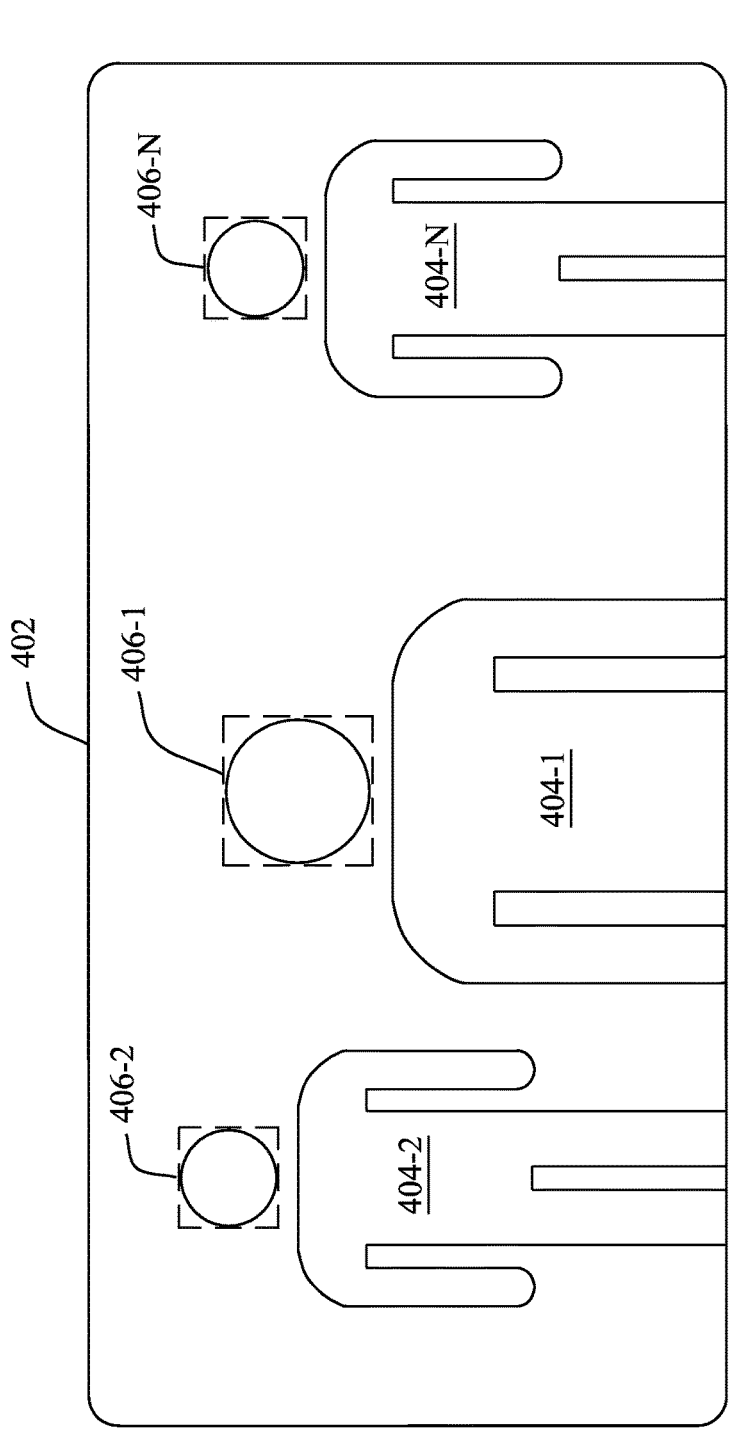

In FIG. 4E, participant 404-1 and participant 404-2 may be identified, based on their physical characteristics, to be the target participants. The width of the bounding box 406-1 around the face of participant 404-1 and the width of the bounding box 406-2 around the face of participant 404-2 may be used to determine an adjustment. For example, an average or weighted average of the widths and/or their corresponding distances or a largest or smallest width and/or corresponding distance may be used to make the determination. In this example, the average width of the bounding box 406-1 around the face of participant 404-1 and the bounding box 406-2 around the face of participant 404-2 may be determined as one hundred sixty pixels. As such, the target participants may be determined to be, on average, four feet from a camera and/or a display used for the video conference as based on the relationship defined in Table 1. By referencing Table 2, an adjustment corresponding to that width and/or distance may be identified. In this instance, the adjustment may be the same adjustment as was applied with respect to FIG. 4B.

Figure 5B:
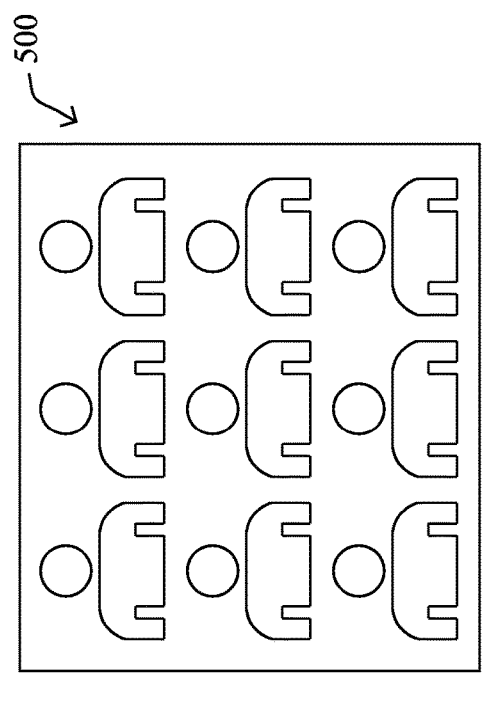
FIGS. 5A-5C illustrate examples of characteristic-based video conference adjustments according to various embodiments.
Figure 5C:
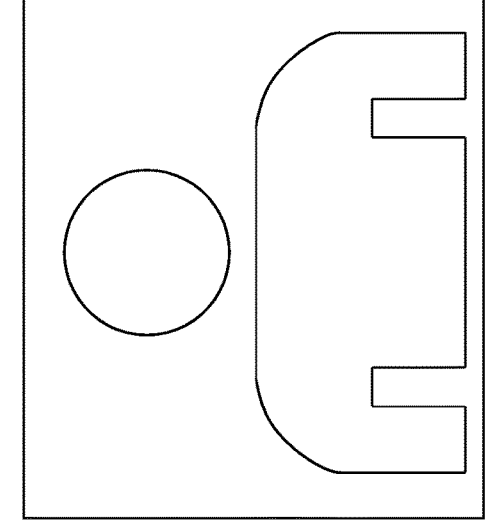
Figure 5A:
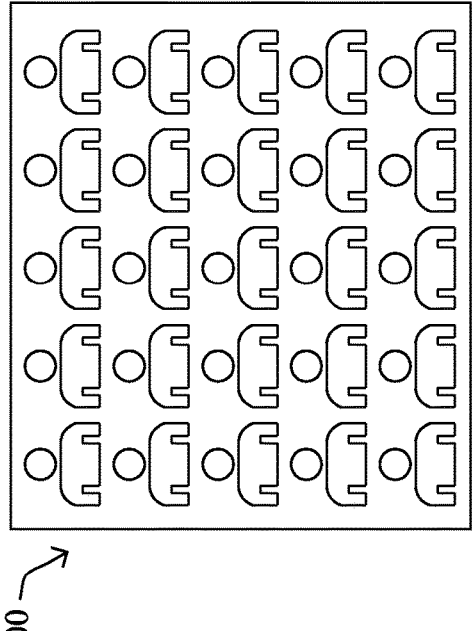

FIGS. 5A-5C illustrate examples of characteristic-based video conference adjustments according to various embodiments. These figures illustrate example configuration of a user interface 500 for a video conferencing application as displayed to a plurality of participants via a video conferencing display. These configurations may represent the layout of the user interface for the video conferencing application as seen by the plurality of participants of the video conference during the video conference session.

FIG. 5A illustrates an interface 500 in a first adjusted configuration. This configuration may correspond to an adjustment to be applied to a user interface of a video conferencing software when a targeted participant is relatively close (e.g., within two feet) of a presentation interface that outputs data for the video conference to the plurality of participants. The configuration is information dense with relatively numerous and small sized elements. Additional adjustments not visible in this illustration may also be applied. For example, this configuration may be complemented by a relatively low volume of video conference audio output, a relatively low microphone sensitivity, and/or a relatively high amount of visual smoothing or image correction applied to images captured of the target participant.

FIG. 5B illustrates an interface 500 in a second adjusted configuration. This configuration may correspond to an adjustment to be applied to a user interface of a video conferencing software when a targeted participant is at an intermediate distance (e.g., between two and four feet) of a presentation interface that outputs data for the video conference to the plurality of participants. The configuration has an intermediate information density with fewer (relative to FIG. 5A) and small intermediate sized elements. Again, additional adjustments not visible in this illustration may also be applied. For example, this configuration may be complemented by a relatively intermediate volume of video conference audio output, a relatively intermediate microphone sensitivity, and/or a relatively intermediate amount of visual smoothing or image correction applied to images captured of the target participant.

FIG. 5C illustrates an interface 500 in a third adjusted configuration. This configuration may correspond to an adjustment to be applied to a user interface of a video conferencing software when a targeted participant is relatively far (e.g., greater than four feet) from a presentation interface that outputs data for the video conference to the plurality of participants. The configuration is informationally limited and displays only critical elements (e.g., a tile showing only the presenter and/or presentation materials) at a large size. Again, additional adjustments not visible in this illustration may also be applied. For example, this configuration may be complemented by a relatively high volume of video conference audio output, a relatively high microphone sensitivity, and/or a relatively low amount of visual smoothing but a relatively high amount of light correction applied for images captured of the target participant.

Figure 6:
FIG. 6 illustrates an example simplified procedure for characteristic-based video conference adjustments.

FIG. 6 illustrates an example simplified procedure (e.g., a method) for characteristic-based video conference adjustments, in accordance with one or more embodiments described herein. For example, a non-generic, specifically configured device (e.g., device 200), may perform procedure 600 by executing stored instructions (e.g., adjustment process 248). The procedure 600 may start at step 605, and continues to step 610, where, as described in greater detail above, a device may detect a plurality of participants in a video conference. The plurality of participants may be detected from video data captured by one or more cameras.

At step 615, as detailed above, a device may determine one or more physical characteristics of the plurality of participants. In further examples, those one or more physical characteristics of the one or more target participants may include an age of the one or more target participants. Additionally, those one or more physical characteristics of the one or more target participants may include an ability indicator of the one or more target participants. Those one or more physical characteristics of the one or more target participants may be determined based on at least one of measured sound levels or radio signals.

At step 620, as detailed above, a device may identify one or more target participants from among the plurality of participants based on their one or more physical characteristics. In some examples, those one or more physical characteristics of the one or more target participants may include a distance between a target participant and a presentation interface that outputs data for the video conference to the plurality of participants. In additional examples, such as where the one or more target participants comprises two or more target participants, those one or more physical characteristics may include an average distance between the two or more target participants and a presentation interface that outputs data for the video conference to the plurality of participants.

At step 625, where, as detailed above, a device may make an adjustment as to how the video conference is presented to the plurality of participants based on those one or more physical characteristics of the one or more target participants. The adjustment may include an adjustment to an amount of participants displayed at a presentation interface that outputs data for the video conference to the plurality of participants. The adjustment may also include an adjustment to an audio level and/or directionality output at a presentation interface that outputs data for the video conference to the plurality of participants. In various embodiments, the adjustment may include an adjustment to at least one of an information density or a size of an element displayed at a presentation interface that outputs data for the video conference to the plurality of participants.

In some instances, the procedure 600 may also include adjusting, by the device, audio gain applied to audio captured from the one or more target participants based on those one or more physical characteristics of the one or more target participants. In additional instances, the procedure 600 may include making multiple physical characteristic determinations and targeted adjustments simultaneously. For instance, in a dual-display video conferencing configuration, an information-dense display may be presented on one monitor and an information-sparse display presented on a second monitor. In the case of speakers, if the video conferencing unit has directional speaker capabilities, a user that has a hearing impairment may be spatially targeted with a volume increase projected toward them while leaving the other speaker volumes/audio projection directions at a universally optimal level.

Procedure 600 may then end at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce mechanisms that improve video conferencing applications and video conferencing communication over a computing network. These mechanisms may be utilized to dynamically identify target participants among a crowd of participants involved in a video conference session. The mechanisms may be used to recognize changes in the involvement and criticality of participants to the flow of a video conference session and fluidly adapt and identify different target participants when situationally appropriate.

These mechanisms may build on this feature by then dynamically adapting the video conference user interface and/or video conference experience to the particular participants identified as target participants during the video conferencing session. The adaptation may be based on physical characteristics of the target participants which may also change during the course of the video conference session. These mechanisms may be utilized to continually adapt the video conference user interface and/or video conference experience to the changes in the physical characteristics as well. As a result, the techniques described herein provide allow a video conference experience to be dynamically optimized to target participants based on their physical characteristics and/or the evolution thereof during a video conference session.

While there have been shown and described illustrative embodiments that provide characteristic-based video conference adjustments, it is to be understood that various other adaptations and modifications may be made within the spirit and scope of the embodiments herein. For example, while certain embodiments are described herein with respect to using the techniques herein for certain purposes, the techniques herein may be applicable to any number of other use cases, as well.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/ RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:

detecting, by a device and from video data captured by one or more cameras, a target participant in a video conference;

determining, by the device, one or more physical characteristics of the target participant, including at least one of distance from a particular camera, size of the target participant within the video data, or location of the target participant within a conference room;

determining, by the device and based on the one or more physical characteristics, a distance of the target participant from a display presenting the video conference to the target participant;

making, by the device, an adjustment to a presentation layout of a set of videoconferencing visual elements from a live videoconferencing session stream of the video conference on the display to the target participant based on the distance of the target participant from the display, wherein the set of videoconferencing visual elements comprises participant video tiles and a shared content tile, and wherein making the adjustment comprises rendering an adjusted presentation layout of the live video conferencing session stream on the display by:

selecting, when the target participant is closer to the display, a first subset of the set of videoconferencing visual elements to be rendered on the display and scaling the first subset of the set of videoconferencing visual elements to a smaller size and/or higher information density, and selecting, when the target participant is farther from the display, a second subset of the set of video conferencing visual elements to be rendered on the display and scaling the second subset of the set of video-conferencing visual elements to a larger size and/or lower information density; and wherein the adjusted presentation layout of the live video-conferencing session stream rendered on the display is independent of a layout of the live videoconferencing session stream simultaneously rendered at other endpoint displays of the video conference.

2. The method as in claim 1, wherein the target participant comprises two or more target participants, and wherein those one or more physical characteristics comprises an average distance between the two or more target participants and a presentation interface that outputs data for the video conference to a plurality of participants.

3. The method as in claim 1, wherein the one or more physical characteristics of the target participant comprises an age of the target participant.

4. The method as in claim 1, wherein the one or more physical characteristics of the target participant comprises a mental ailment of the target participant.

5. The method as in claim 1, wherein the one or more physical characteristics of the target participant comprises an ability indicator of the target participant.

6. The method as in claim 1, wherein the one or more physical characteristics of the target participant are determined based on at least one of measured sound levels or radio signals.

7. The method as in claim 1, wherein the adjustment comprises an adjustment to an amount of participants displayed at a presentation interface that outputs data for the video conference to the target participant.

8. The method as in claim 1, wherein the adjustment comprises an adjustment to at least one of an audio level or an audio directionality output at a presentation interface that outputs data for the video conference to the target participant.

9. The method as in claim 1, wherein the adjustment comprises an adjustment to at least one of an information density or a size of an element displayed at a presentation interface that outputs data for the video conference to the target participant.

10. The method as in claim 1, further comprising:

adjusting, by the device, audio gain applied to audio captured from the target participant based on the one or more physical characteristics of the target participant.

11. The method of claim 1, wherein the adjustment comprises modifying a number and/or size of video tiles displayed to the target participant based on the distance from the display.

12. The method of claim 1, wherein the adjustment comprises scaling images or graphical content within the video conference, and/or modifying font size of textual elements displayed to the target participant based on the distance from the display.

13. An apparatus, comprising:

one or more network interfaces;

a processor coupled to the one or more network interfaces and configured to execute one or more processes; and a memory configured to store a process that is executable by the processor, the process when executed configured to:

detect, from video data captured by one or more cameras, a target participant in a video conference;

determine one or more physical characteristics of the target participant, including at least one of distance from a particular camera, size of the target participant within the video data, or location of the target participant within a conference room;

determine, based on the one or more physical characteristics, a distance of the target participant from a display presenting the video conference to the target participant;

make an adjustment to a presentation layout of a set of videoconferencing visual elements from a live videoconferencing session stream of the video conference on the display to the target participant based on the distance of the target participant from the display, wherein the set of videoconferencing visual elements comprises participant video tiles and a shared content tile, and wherein making the adjustment comprises rendering an adjusted presentation layout of the live video conferencing session stream on the display by:

selecting, when the target participant is closer to the display, a first subset of the set of videoconferencing visual elements to be rendered on the display and scaling the first subset of the set of videoconferencing visual elements to a smaller size and/or higher information density, and selecting, when the target participant is farther from the display, a second subset of the set of video conferencing visual elements to be rendered on the display and scaling the second subset of the set of videoconferencing visual elements to a larger size and/or lower information density; and wherein the adjusted presentation layout of the live videoconferencing session stream rendered on the display is independent of a layout of the live videoconferencing session stream simultaneously rendered at other endpoint displays of the video conference.

14. The apparatus as in claim 13, wherein the one or more physical characteristics of the target participant comprises an age of the target participant.

15. The apparatus as in claim 13, wherein the one or more physical characteristics of the target participant comprises an ability indicator of the target participant.

16. The apparatus as in claim 13, wherein the adjustment comprises an adjustment to an amount of participants displayed at a presentation interface that outputs data for the video conference to the target participant.

17. The apparatus as in claim 13, wherein the adjustment comprises an adjustment to at least one of an audio level or an audio directionality output at a presentation interface that outputs data for the video conference to the target participant.

18. The apparatus as in claim 13, wherein selecting the second subset of the set of videoconferencing visual elements comprises:

identifying a role of the target participant with respect to the video conference; and selecting videoconferencing visual elements for inclusion in the second subset according to a priority assigned, for the identified role, to each of the videoconferencing visual elements.

19. The apparatus as in claim 13, the process when executed further configured to:

adjust audio gain applied to audio captured from the target participant based on the one or more physical characteristics of the target participant.

20. A non-transitory computer-readable medium storing program instructions that cause a device to execute a process comprising:

detecting, by the device and from video data captured by one or more cameras, a target participant in a video conference;

determining, by the device, one or more physical characteristics of the target participant, including at least one of distance from a particular camera, size of the target participant within the video data, or location of the target participant within a conference room;

determining, by the device and based on the one or more physical characteristics, a distance of the target participant from a display presenting the video conference to the target participant;

making, by the device, an adjustment to a presentation layout of a set of videoconferencing visual elements from a live videoconferencing session stream of the video conference on the display to the target participant based on the distance of the target participant from the display, wherein the set of videoconferencing visual elements comprises participant video tiles and a shared content tile, and wherein making the adjustment comprises rendering an adjusted presentation layout of the live video conferencing session stream on the display by:

selecting, when the target participant is closer to the display, a first subset of the set of videoconferencing visual elements to be rendered on the display and scaling the first subset of the set of videoconferencing visual elements to a smaller size and/or higher information density, and selecting, when the target participant is farther from the display, a second subset of the set of video conferencing visual elements to be rendered on the display and scaling the second subset of the set of videoconferencing visual elements to a larger size and/or lower information density; and wherein the adjusted presentation layout of the live videoconferencing session stream rendered on the display is independent of a layout of the live videoconferencing session stream simultaneously rendered at other endpoint displays of the video conference.

\* \* \* \* \*